(12) United States Patent
Koleoglou

(10) Patent No.: US 7,789,793 B2
(45) Date of Patent: Sep. 7, 2010

(54) BEARING TOOTH GEARS FOR WIND TURBINE APPLICATIONS

(76) Inventor: Alex Koleoglou, P.O. Box 477, Montauk, NY (US) 11954

(*) Notice: Subject to any disclaimer, the term of this patent is extended or adjusted under 35 U.S.C. 154(b) by 0 days.

(21) Appl. No.: 12/228,731

(22) Filed: Aug. 15, 2008

(65) Prior Publication Data
US 2009/0048051 A1 Feb. 19, 2009

Related U.S. Application Data

(60) Provisional application No. 60/965,068, filed on Aug. 17, 2007, provisional application No. 61/011,905, filed on Jan. 22, 2008.

(51) Int. Cl.
*F16H 1/32* (2006.01)
*F16H 57/08* (2006.01)
(52) U.S. Cl. .................. 475/344; 475/168; 475/180; 475/331
(58) Field of Classification Search ............ 475/17, 475/168, 180, 344; 74/416, 417, 464, 465
See application file for complete search history.

(56) References Cited

U.S. PATENT DOCUMENTS

| 219,706 | A | 9/1879 | Flynn |
| 305,714 | A | 9/1884 | Schulze-Berge |
| 586,055 | A | 11/1892 | Saladee |
| 554,138 | A | 2/1896 | Negbaur et al. |
| 596,884 | A | 1/1898 | Jamieson |
| 616,381 | A | 12/1898 | White |
| 633,470 | A | 9/1899 | McCormick |
| 642,990 | A | 2/1900 | LLoyd |
| 874,342 | A | 12/1907 | Janson |
| 879,679 | A | 2/1908 | Schmick |
| 2,597,389 | A | 5/1952 | Setter |
| 2,750,814 | A * | 6/1956 | Wildhaber .................. 475/180 |

(Continued)

FOREIGN PATENT DOCUMENTS

FR 2791319 9/2000

(Continued)

OTHER PUBLICATIONS

Dhelsen Associates,LLC, "Distributed Generation Drivetrain for Windpower Application", California Energy Commission, Feb. 2006,pp. 1-23.

(Continued)

*Primary Examiner*—Tisha D Lewis
(74) *Attorney, Agent, or Firm*—Alfred M. Walker

(57) ABSTRACT

A horizontal axis wind turbine includes a vertically extending tower 117 having a rotatable long shaft 121. A bottom end of the long shaft drives an electric generator 122 and a top end of the long shaft is connected to a power output gear assembly of a bearing tooth angle drive 120. The power output gear assembly is engaged with a power input gear in the bearing tooth angle drive 120. The power input gear is connected by a drive shaft 86 through a preferably planetary gear drive 119 to blades 106 of a wind turbine to receive power from the wind turbine and to deliver torque to the long shaft 121 to drive the generator 122. The planetary gear teeth preferably have flat surfaces providing contact with related gear teeth.

14 Claims, 10 Drawing Sheets

U.S. PATENT DOCUMENTS

| | | | |
|---|---|---|---|
| 3,486,269 A | 12/1969 | Fischer | |
| 3,495,470 A | 2/1970 | McCartin | |
| 3,608,392 A | 9/1971 | Gilbert | |
| 3,661,028 A | 5/1972 | Fuchs | |
| 3,942,026 A | 3/1976 | Carter | |
| 4,134,707 A | 1/1979 | Ewers | |
| 4,204,805 A | 5/1980 | Bolie | |
| 4,281,965 A | 8/1981 | Stjernholm | |
| 4,291,233 A * | 9/1981 | Kirschbaum | 290/1 C |
| 4,311,435 A * | 1/1982 | Bergero | 416/170 R |
| 4,495,423 A | 1/1985 | Rogers | |
| 4,613,760 A * | 9/1986 | Law | 290/1 C |
| 4,636,707 A | 1/1987 | Law | |
| 5,083,901 A | 1/1992 | Griffin, Jr. et al. | |
| 5,222,924 A * | 6/1993 | Shin et al. | 475/329 |
| 5,332,354 A | 7/1994 | Lamont | |
| 5,381,704 A | 1/1995 | Knotts | |
| 5,384,489 A | 1/1995 | Bellac | |
| 5,457,346 A | 10/1995 | Blumberg et al. | |
| 5,497,671 A | 3/1996 | Rourke | |
| 5,704,248 A | 1/1998 | Knotts | |
| 5,863,273 A * | 1/1999 | Kuehnle | 475/331 |
| 5,876,181 A * | 3/1999 | Shin | 415/2.1 |
| 6,064,123 A | 5/2000 | Gislason | |
| 6,260,793 B1 | 7/2001 | Balayn et al. | |
| 6,276,633 B1 | 8/2001 | Balayn et al. | |
| 6,784,566 B2 | 8/2004 | Thomas | |
| 6,830,215 B2 * | 12/2004 | Sandrart et al. | 244/56 |
| 6,923,615 B2 | 8/2005 | Crinion | |
| 6,998,723 B2 | 2/2006 | Kong et al. | |
| 7,056,259 B2 | 6/2006 | Fox | |
| 7,126,235 B2 | 10/2006 | Bernhoff et al. | |
| 2004/0159172 A1 | 8/2004 | Barkdoll | |
| 2006/0220389 A1 | 10/2006 | Shibata et al. | |

FOREIGN PATENT DOCUMENTS

| | | | |
|---|---|---|---|
| FR | 2791634 | | 10/2000 |
| JP | 05-079450 | | 3/1993 |
| JP | 05079450 A | * | 3/1993 |
| JP | 05223054 A | | 8/1993 |
| JP | 09319222 | | 12/1997 |
| JP | 2003-129937 | | 5/2003 |
| JP | 20032786 | | 10/2003 |
| RO | 2253040CL | | 5/2005 |

OTHER PUBLICATIONS

Conway, "Roller Pinion Systems—An alternative to traditional linear drives", Medical Design Magazine, Jun. 2007 p. 22.

Danish Wind Industry Association, "Wind Turbines: Horizontal or Vertical Axis Machines?" May 2007 pp. 1-2, web site of windpower. org.

Sterzinger, "Wind Turbine Development: Location of Manufacturing Activity", Renewable Energy Policy Project, Technical Report, Sep. 2004,pp. 1-18.

PCT International Search Report and Written Opinion of Applicant Alex Koleoglou in PCT/US2008/009785 dated Aug. 15, 2008.

* cited by examiner

BEARING TOOTH GEARS FOR WIND TURBINE APPLICATIONS

RELATED APPLICATIONS

This application is based upon provisional application Ser. No. 60/965,068 filed Aug. 17, 2007 and upon provisional application Ser. No. 61/011,905 filed Jan. 22, 2008 and claims priority and benefit under 35 U.S.C. 119(e) therefrom. These applications are incorporated by reference herein.

FIELD OF THE INVENTION

The present invention relates to reliable and efficient horizontal axis wind turbines.

BACKGROUND OF THE INVENTION

Since the proliferation of modern horizontal axis wind turbines over the past decade, experience and operating statistics have demonstrated that the speed-increasing gearbox has been the source of most field failures. The most prevalent design of current wind turbines places a nacelle atop a tall tower, the nacelle housing a gearbox driven by the turbine propeller as well as the generator attached to the gearbox. To service the gearbox involves personnel entering the nacelle to perform the task of repair or replacement of the gearbox. A recent fall fatality in Great Britain underscores the danger involved in just gaining access to the top of the tower. Very large wind turbines are being deployed farther offshore at present. The operation and maintenance (O&M) costs are estimated to be twice that of their comparable terrestrial counterparts. It is therefore desirable to minimize unscheduled maintenance calls to wind turbines, to make gearboxes more reliable, and to make equipment more accessible. To achieve these objectives while also increasing efficiency is a bonus.

Bearing tooth gears are gears (in meshing gear sets) where the gear teeth are replaced by bearings thereby replacing all or most of the tooth sliding friction by rolling friction. The prior art reveals the use of plain bearings as well as rolling element bearings such as ball bearings. Many patents in the prior art relate to bearing tooth gears of a variety of types. A brief description of a few exemplary patents follows. Saladee, in U.S. Pat. No. 486,055 shows a spur type bearing gear meshing with a ring type bearing gear in a planar drive for a velocipede. Right angle drives using bearing gears (instead of bevel gears) are described in patents of Jamieson (U.S. Pat. No. 596,884) and Lloyd (U.S. Pat. No. 642,990) in relation to bicycles. U.S. Pat. No. 5,381,704 of Knotts uses bearing gears in angle drives not necessarily at right angles to each other; cylindrical bearings are used on one axis meshing with highly externally contoured bearings on the second axis to minimize backlash. Bearing tooth gears are typically used with no lubrication except for what is sealed inside each of the bearings; they reduce frictional losses thereby increasing efficiency of gearboxes or angle drives. They are inherently reliable by design.

To make equipment more accessible in a wind turbine, it is advantageous to have as much of the required equipment as possible at ground level. If a long shaft transmitting torque from the turbine atop a tower is used, the generator and gearbox can be located at ground level. This arrangement has been used to advantage especially in vertical axis wind turbines using a variety of airfoil types. Ewers (U.S. Pat. No. 4,134,707) relates to a vertical axis wind turbine using a guyed tall stack of airfoils attached to a common shaft driving a base-mounted gearbox and generator. Bolie (U.S. Pat. No. 4,204,805) illustrates a vertical axis wind turbine directly driving a long shaft within a tower down to a base-mounted vertical axis generator with integral gearbox. Japanese patent publication 2003278639 of Katsuhiro & Kazumi shows a modern three-blade horizontal axis turbine driving a long shaft through a bevel-gear angle drive which is attached to a gearbox driving a generator; both gearbox and generator are at base level and have vertical shaft orientation. U.S. Pat. No. 554,138 of Negbaur & Feely shows a multi-blade horizontal axis wind turbine driving a long vertical shaft via a bevel gear angle drive. The bottom of the long shaft has a second bevel gear angle drive to power a direct drive horizontal axis generator at ground level.

The prior art does not reveal modifications of bearing tooth gear systems for wind turbine use nor their integration with large horizontal axis wind turbines to improve reliability, accessibility, and efficiency.

OBJECTS OF THE INVENTION

It is an object of this invention to modify bearing gear tooth gear sets so as to be better able to survive very heavy torque loads such as for large horizontal axis wind turbines.

It is therefore an object of the present invention to provide a reliable, accessible, and efficient horizontal axis wind turbine.

It is also an object of the present invention to provide a horizontal axis wind turbine with maximum ground level accessible gear and generation equipment.

It is therefore an object of the present invention to provide a horizontal axis wind turbines which operates with minimal lubrication and minimal friction loss.

It is also an object of the present invention to reduce contact stress concentrations of meshing gears.

It is also an object of the present invention to provide an ergonomic worker safe horizontal axis wind turbine which minimizes the possibility of worker injuries.

It is yet another object of the present invention to provide lowered scheduled maintenance costs due to easy access to a generator and related controls.

It is still another object to provide lowered replacement costs of failed generator or controls.

It is also an object of the present invention to provide easy access to working generator and gear box parts for a wind turbine on the ground instead of being typically 300 feet up in the air in the vicinity of the rotating wind turbine blades.

Other objects which become apparent from the following description of the present invention.

SUMMARY OF THE INVENTION

Bearing tooth gears can have a beneficial effect on reliability, accessibility, and efficiency of large horizontal axis wind turbines. However, the bearing tooth gear sets for this application and others that demand high load capability should be modified somewhat. As in the past, bearings that can be used as a gear tooth range over plain bearings as well as rolling element bearings such as ball, roller, or needle bearings. Plain bearings using a self lubricating, low friction material often outlast rolling element bearings in intermittent motion applications as this since the lubricant is dispersed through the bearing material. One such bearing material is VESCO-NITE® from Vesco Plastics Sales of Cleveland, South Africa. However, roller element bearings do generally offer lower friction; special greases or dry lubricants can be formulated to excel in intermittent motion applications. Ceramic bearings or hybrid ceramic bearings using ceramic balls, rollers and/or races can actually run with long service life without any lubricant whatsoever. Note that a gearbox or an angle drive using bearing tooth gears does not operate in an enclosure in an oil bath or with pressurized lubrication.

Bearings or cam followers found in catalogs as standard parts may not be available in load ratings high enough to configure gear sets or drives for wind turbines which today have ratings as high as five megawatts (approximately 6700 horsepower). Planar gear set drives such as spur gear types consist of meshing bearings carried on the periphery of disks. In one embodiment of this invention, such a bearing tooth gear set is configured to use multiple parallel disks to engage multiple bearings simultaneously on a common shaft thereby multiplying the load capacity of a single bearing. To reduce twist deformation of the common shaft and to enhance the load sharing, the larger of the meshing gears in a gear set stage is fabricated with spoked disks which permit a small amount of torsional deformation (or wind-up) under load. By combining a ring gear configuration with a number of internal spur gears, the familiar planetary gear stage is configured. Bearing gear tooth gears can be used to implement such a planetary gear box. Multiple parallel ring gears meshing with multiple parallel bearing tooth spur gears forming planets and sun gear can be used to create a very robust planetary gear stage using bearing elements of only modest capacity.

To improve the smoothness of operation and to insure continuous coupling between mating bearing gears, a second embodiment of bearing tooth gears comprising double attached (or double-sided) disks each carrying bearings on its periphery with the same pitch but offset by a half pitch is used. This configuration also reduces the need for tight manufacturing tolerances by permitting larger clearances. The parallel multi-plate configurations of the first embodiment can also be enhanced by using the double-sided disks to replace each of the single disks.

An angle drive version of the double-sided disk configuration constitutes another embodiment of this invention. In the angle drive, a double-sided input disk couples with a disk in the output shaft direction on each side of the input disk. In turn, each of output disks is attached to a larger diameter bearing tooth gear. These two larger diameter gears also mesh and drive a single output shaft attached to one of the gears. The two larger diameter gears may be single or double-sided types.

A typical configuration of a modern horizontal axis wind turbine uses a very slow speed propeller coupled to a multi-stage planetary gearbox to increase the speed to an attached generator; all this equipment is enclosed in a nacelle at the top of a tall tower. It would be expensive to use one of the prior art configurations to eliminate the generator and gearbox from the nacelle by coupling immediately from the propeller shaft to an angle drive and then down the tower via a long shaft. The problem is the enormous torque that must be resisted by the angle drive as well as the long shaft. By increasing the reliability of the gearbox and distributing its speed-up elements, some of this is prudently left in the nacelle while reducing the torque load on the angle drive and the long shaft. The reliability and efficiency of the nacelle-resident subsystem is greatly enhanced by the use of bearing tooth gears, and the accessibility to the generator and associated gear is enhanced by relocating it to ground level.

In the preferred embodiment, the propeller shaft would drive a single or multiple stages of bearing tooth gear planetary gearbox. (For example, while other ratios may be applicable, a 16:1 speed up ratio can be easily achieved with a 2-stage planetary gear box to reduce the torque load on the right angle drive.) The output of the gearbox would drive a bearing tooth angle drive which couples to a long shaft down the tower length to a low speed large diameter direct-drive vertical axis generator of the type often used in hydroelectric installations. Note that the single planetary stage can easily provides a 4:1 or more speed-up thereby reducing the torque load on the angle drive by a factor of 4. The angle drive itself can further offer a 2:1 or more speed-up thereby reducing the torque load of the long shaft to a more manageable ⅛ of the propeller shaft torque rating. (Alternatively, the angle drive can simply have a 1:1 ratio with no change in speed between the input and output shafts.) Since the generator is at ground level, diameter size is not compromised by the need for slender nacelle dimensions; weight is not a major factor since a crane is not needed to lift it to the top of a tall tower.

In an alternate embodiment, a horizontal axis generator is used at ground level by the simple addition of a second bearing tooth right-angle drive at the bottom end of the long shaft. An optional additional stage of bearing-tooth speed-up gearbox can be inserted between the bottom right-angle drive and the generator if a high speed type is desired.

By providing a gearmotor and gear box at ground level, there should be lowered scheduled maintenance costs due to easy access to the generator and related controls, with related lowered replacement costs of any failed generator or controls. Therefore easy access is provided to working generator and gear box parts for a wind turbine on the ground, instead of having to maintain the generator and gear box parts typically 300 feet up in the air in the vicinity of the rotating wind turbine blades.

The use of bearing teeth with a round periphery introduces high compressive stress in the contact region as the bearings mesh. For co-planar meshing bearing tooth gears, the contact configuration is a line contact. For orthogonal meshing bearing tooth gears the contact configuration is a point contact. To reduce this contact stress concentration, which can exceed 300,000 pounds per square inch (psi), which exceeds the working stress of high alloy steels, the peripheral geometry of the bearing teeth themselves is changed from round to a regular polygon such as a square or a hexagon, or an external contact housing of these shapes is press fit onto the round bearing periphery. In preferred embodiments, a hexagonal periphery is used for co-planar meshing bearing tooth gears whereas a square periphery is used for orthogonal meshing bearing tooth gears. These changes convert the contact configuration of both species to a flat surface area contact thereby greatly reducing contact region stress concentration at the expense of introducing a small amount of sliding friction. The latter can be mitigated by using a solid lubricant coating on the contact surfaces.

BRIEF DESCRIPTION OF THE DRAWINGS

The present invention can best be understood in connection with the accompanying drawings. It is noted that the invention is not limited to the precise embodiments shown in drawings, in which.

DETAILED DESCRIPTION OF THE INVENTION

Figure 1:
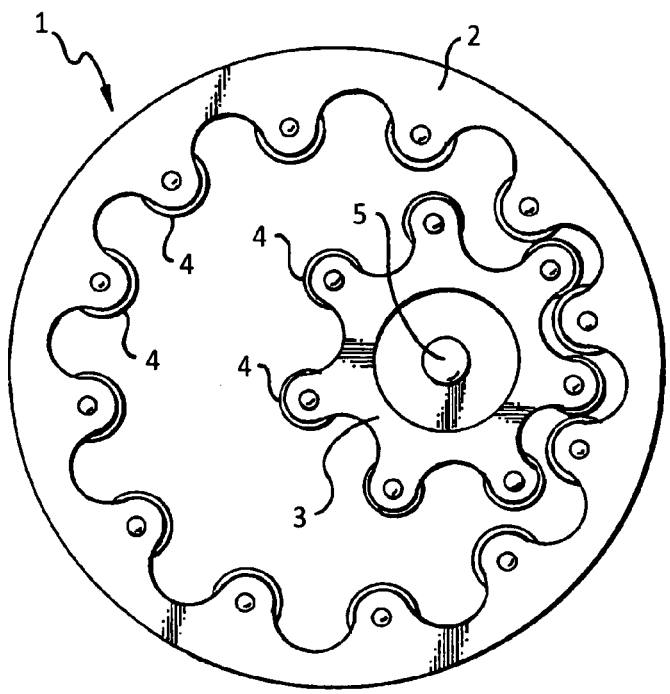
FIG. 1 is a top plan view of a spur bearing tooth gear meshing with a ring type bearing tooth gear (prior art)
Figure 2:
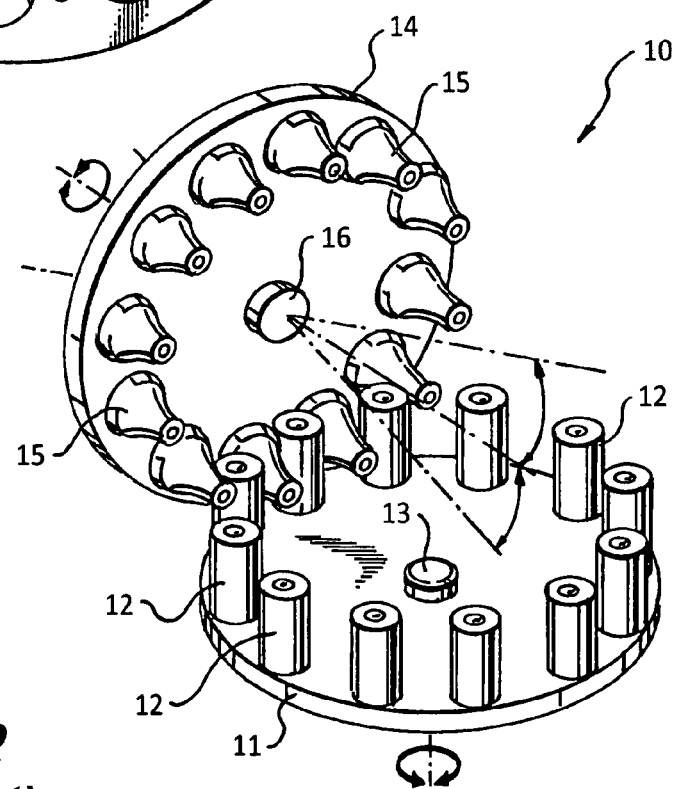
FIG. 2 is a perspective view of a bearing tooth angle drive (as in the prior art)

Two types of prior art bearing tooth gear sets are shown in FIGS. 1 and 2. Gear set 1 is planar, consisting of spur gear disk 3 with bearings 4 mounted at its periphery at a regular pitch engaged with ring disk 2 also with bearings 4 at the same pitch. Shaft 5 is at the center of gear disk 3.

A right-angle drive 10 is shown in FIG. 2. Vertical disk 14 turns on shaft 16 and carries bearings 15 with contoured surface on one face. Horizontal disk 11 turning on shaft 13 carries cylindrical bearings 12 at the same pitch as bearings 15 with which they are engaged. Note that the angle between shafts 13 and 16 can deviate as shown by the arrows while still transmitting torque adequately in the desired direction.

Figure 3:
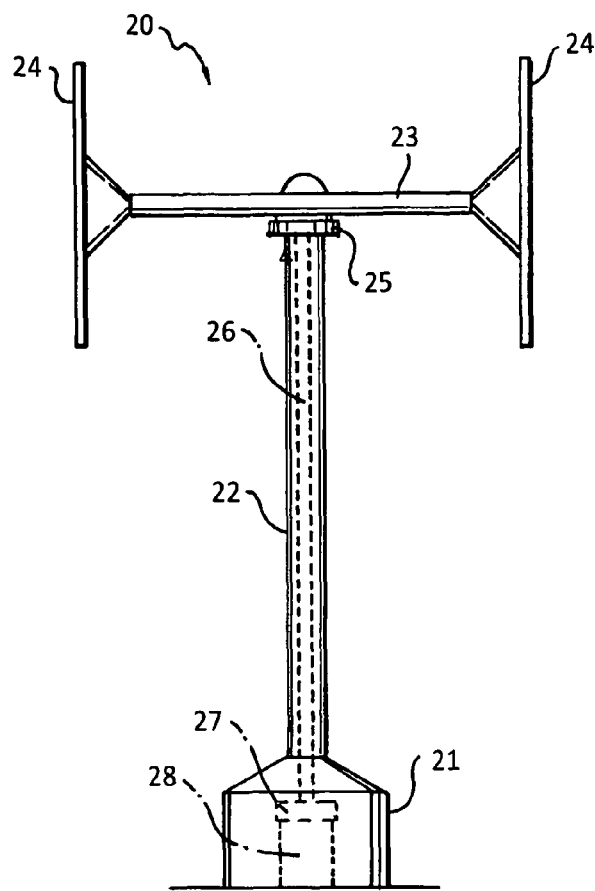
FIG. 3 is a side elevation view of a vertical axis wind turbine with base mounted vertical axis generator (prior art)
Figure 4:
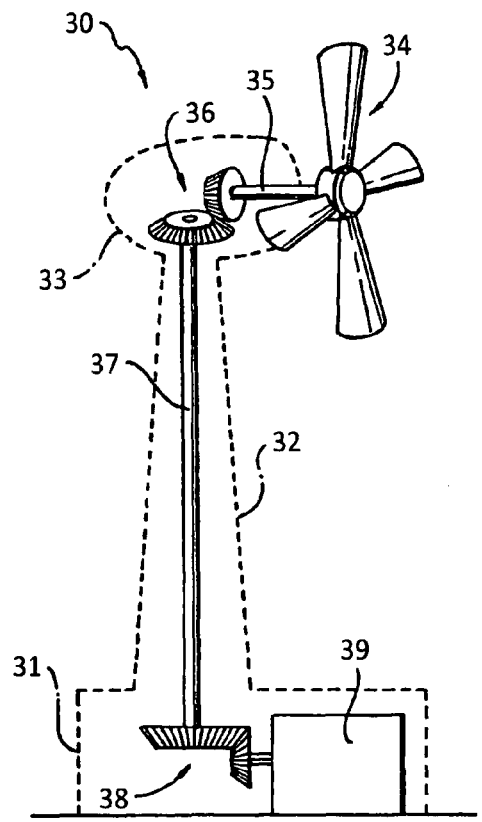
FIG. 4 is a side elevation view of a horizontal axis wind turbine with base mounted horizontal axis generator (prior art)

Two examples of prior art wind turbines with base mounted generators are shown in FIGS. 3 and 4.

FIG. 3 shows a vertical axis wind turbine 20 with top bearing assembly 25 atop tower 22 permitting crossbar 23 to turn by action of airfoils 24. Crossbar 23 is attached to long shaft 26 which drives gearbox 27 atop generator 28 at the base; generator 28 is in a vertical axis configuration.

Wind turbine 30 of FIG. 4 is a horizontal axis type with blade assembly 34 driving shaft 35 coupled to bevel gear drive 36. Nacelle 33 houses the angled bevel gear drive 36. Shaft 37 inside tower 32 is engaged with lower right-angle bevel gear drive coupled to generator 39 which has a horizontal shaft orientation within equipment housing 31.

Figure 5:
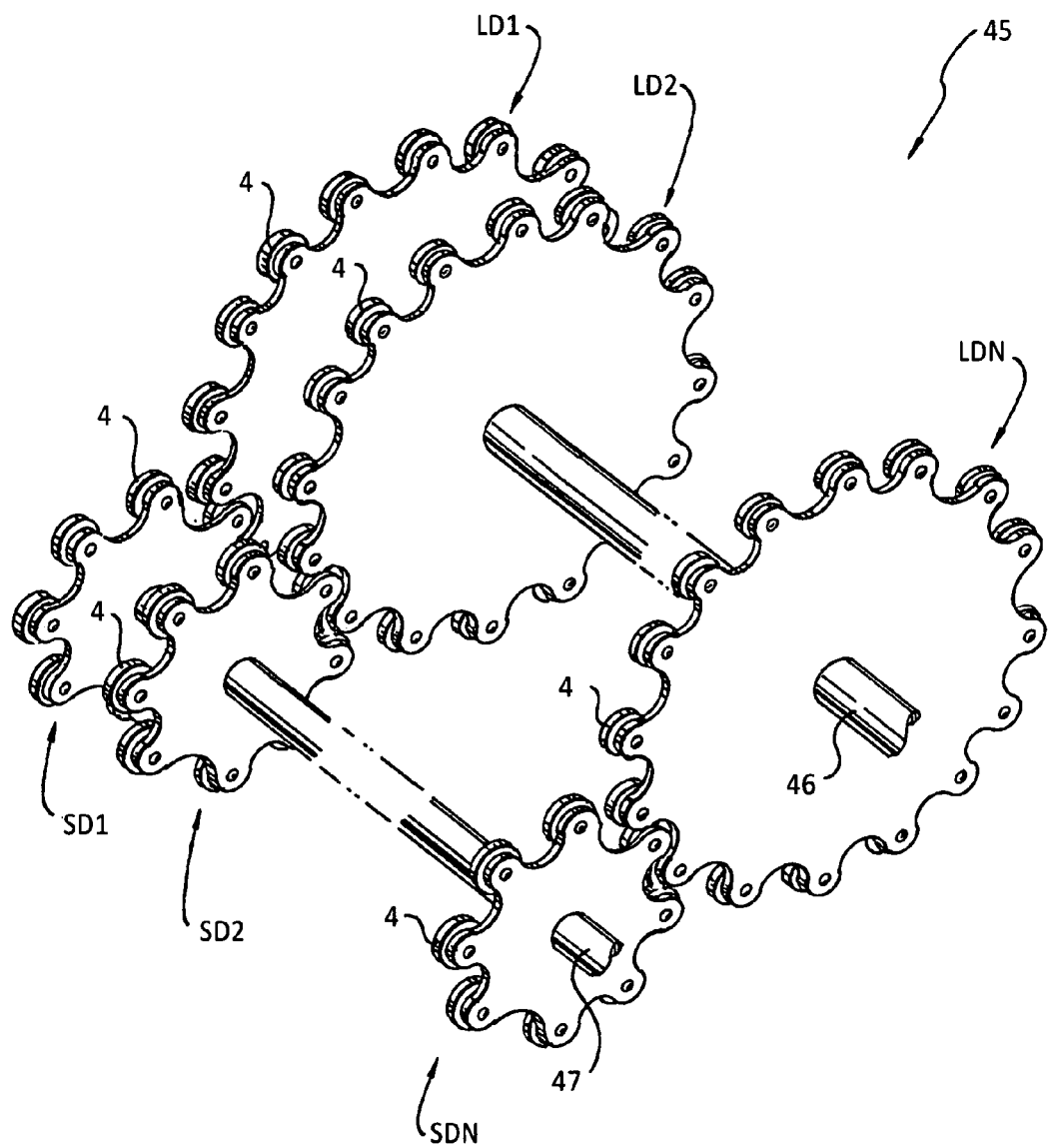
FIG. 5 is a perspective view of a multiple parallel disk spur-type bearing tooth gear drive of this invention.

A multiple parallel disk spur gear drive 45 using bearing tooth gears is shown in FIG. 5. This is one method to fabricate a high capacity drive to create a speed ratio from medium capacity bearing elements 4. Multiple large disks LD1, LD2, . . . , Ldn are all mounted onto common shaft 46. They engage multiple small disks SD1, SD2, . . . , SDn which are mounted on shaft 47. Shaft 47 will turn faster than shaft 46.

Figure 6:
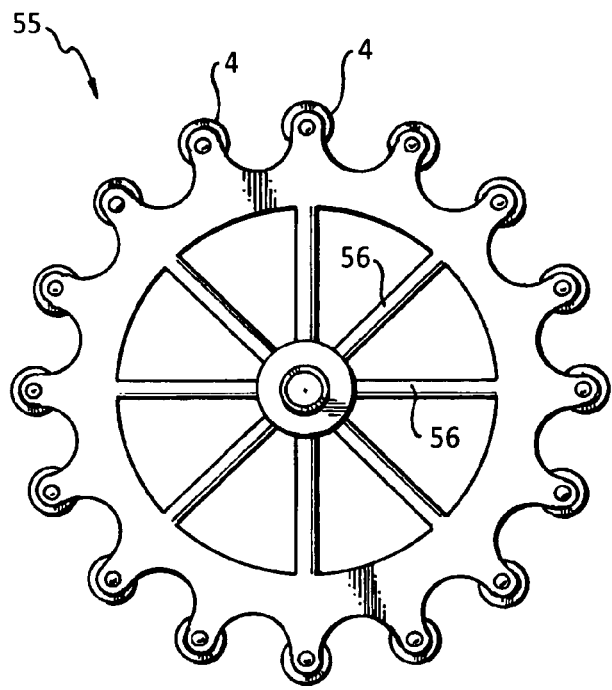
FIG. 6 is a top plan view of a spoke disk bearing tooth spur gear in an unloaded configuration.
Figure 7:
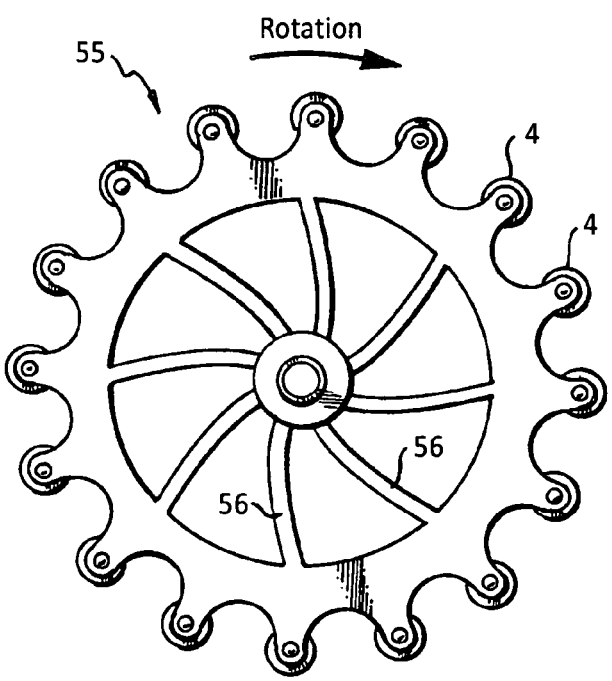
FIG. 7 is a top plan view of the spoke disk of FIG. 6 under load (distortion exaggerated)

By using spoked larger disks 55 as shown in FIG. 6, better sharing of load is achieved among the parallel disks with less twist of drive shaft 46. Spokes 56 would twist slightly (shown exaggerated) as in FIG. 7.

Figure 8:
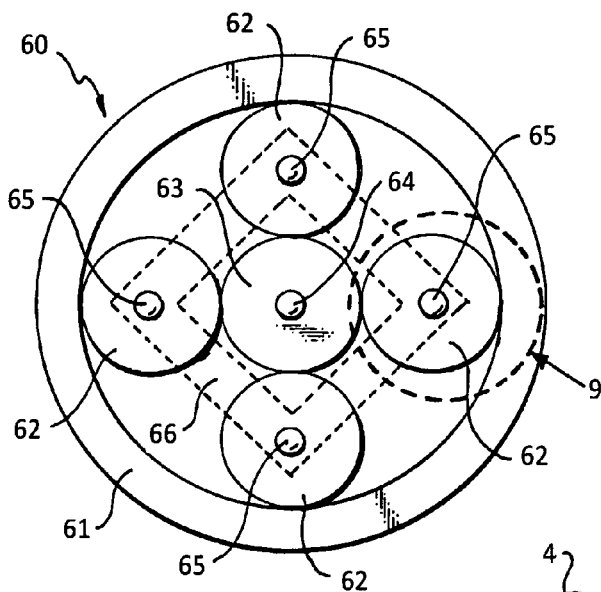
FIG. 8 is a top plan view of a planetary gear stage using 4 planet gears.

FIG. 8 shows a typical plan for an optional planetary gear drive stage 60 with ring gear 61, four planet gears 62, and sun gear 63. For use as a step-up gear box, ring gear 61 is fixed and the input shaft is attached to planet 62 carrier 66 (shown in dashed lines) thereby spinning all four planets 62 on their shafts 65 inside ring gear 61 and around sun gear 63. In the configuration shown, four gear teeth are continuously engaged at all times from input to output. Although other variations are possible, with sun and planets of equal diameter, a ratio of speed of 4:1 or more is achieved from input to output shaft 64 at the sun gear 63. While FIG. 8 shows a single planetary gear drive stage 60, it is noted that multiple planetary gear drive stages 60 can be used in series. For example, a two stage planetary gear assembly can be used. The increased speed reduces the size of the components used because the torque demand is reduced. Furthermore, in a planetary gear one needs to restrict the rotation of one of the components, otherwise, with the rotation of the whole assembly, there wouldn't be any increase in speed of a particular component.

Figure 9:
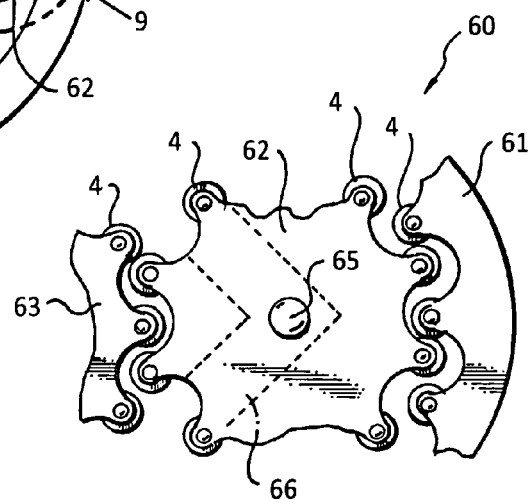
FIG. 9 is a close-up detail view of the engagement of the ring gear, a planet gear, and the sun gear of the planetary gear stage of FIG. 8 using bearing tooth gears (showing actual clearances exaggerated for clarity)

FIG. 9 shows a detail of the engagement when implemented using bearing gear teeth. Clearances are exaggerated in the figure for clarity. If smaller bearings 4 are used which cannot supply the required torque capacity, multiple parallel plates for ring, 61, planet 62, and sun 63 gears can be used as described in FIG. 5.

Figure 10:
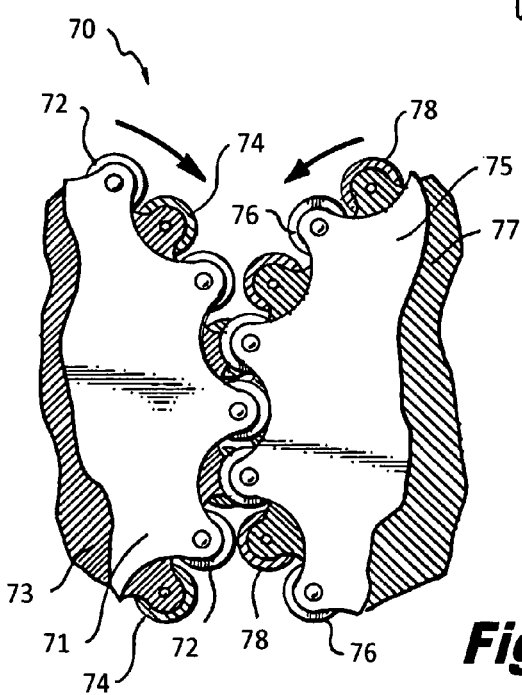
FIG. 10 is a top plan view detail of this invention of the Double-sided Disk Bearing Tooth Gear with Offset (DDBTGO) engagement with a like gear (showing actual clearances exaggerated)

FIG. 10 illustrates the Double-sided Disk Bearing Tooth Gear with Offset (DDBTGO) design of bearing tooth gears of this invention. A detail of two meshed gears 70 is shown. Each of the gears has double sided plates carrying attached bearings at half-pitch offset. The top plate 71 of the left gear is engaged with the top plate 75 of the right gear via the engagement of left top plate bearings 72 with right top plate bearings 76. Then, shown in crosshatch, bottom left plate 73 is engaged with bottom right plate 77 via the engagement of bottom left bearings 74 and bottom right plate bearings 78. Thus this DDBTGO gear set never loses contact and drives continuously even with generous manufacturing tolerances. The extra set of drive bearings also introduces more redundancy.

Figure 11:
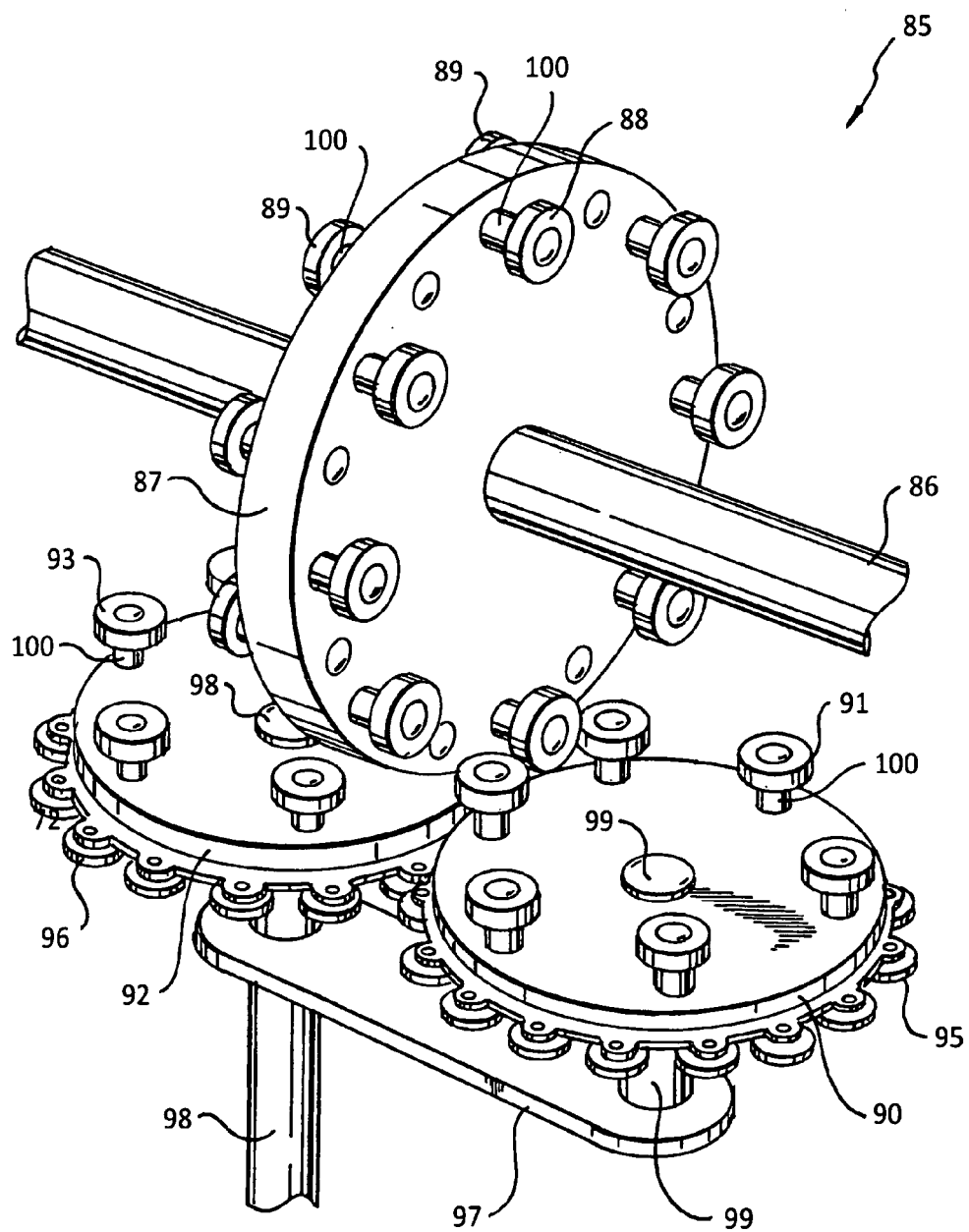
FIG. 11 is a perspective view of a DDBTGO angle drive of this invention.

As shown in FIG. 11, the DDBTGO version 85 of an angle drive stage is a bit more complex. Here, input shaft 86 is shown horizontal, and the output shaft 98 is vertical. For wind turbine application, input shaft 86 is slightly pitched up to the right (assuming the driving propeller is on the right) to avoid blade-tower strikes in high gusts. It can be appreciated that deviation from a right-angle is easily accommodated by the configuration shown in FIG. 11. Vertical drive disk 87 has bearings 88 on short extended shafts 100 emanating from one face while bearings 89 on short extended shafts 100 emanate from the opposite face at the same pitch, but offset half a pitch distance. Bearings 88 engage bearings 91 attached to horizontal disk 90, while bearings 89 engage bearings 93 attached to horizontal disk 92. Bearing disk 90 is attached to a larger diameter DDBTGO 95 while bearing disk 92 is attached to DDBTGO 96. Bearings tooth gears 95 and 96 also engage each other with spacer arm 97 locating both output shaft 98 attached to gear 96 as well as the idler shaft 99 of disk 95. Clearances are greatly exaggerated in the figure. The speed ratio of the angle drive 85 shown is 2:1 step-up from input to output.

Figures 12, 13:
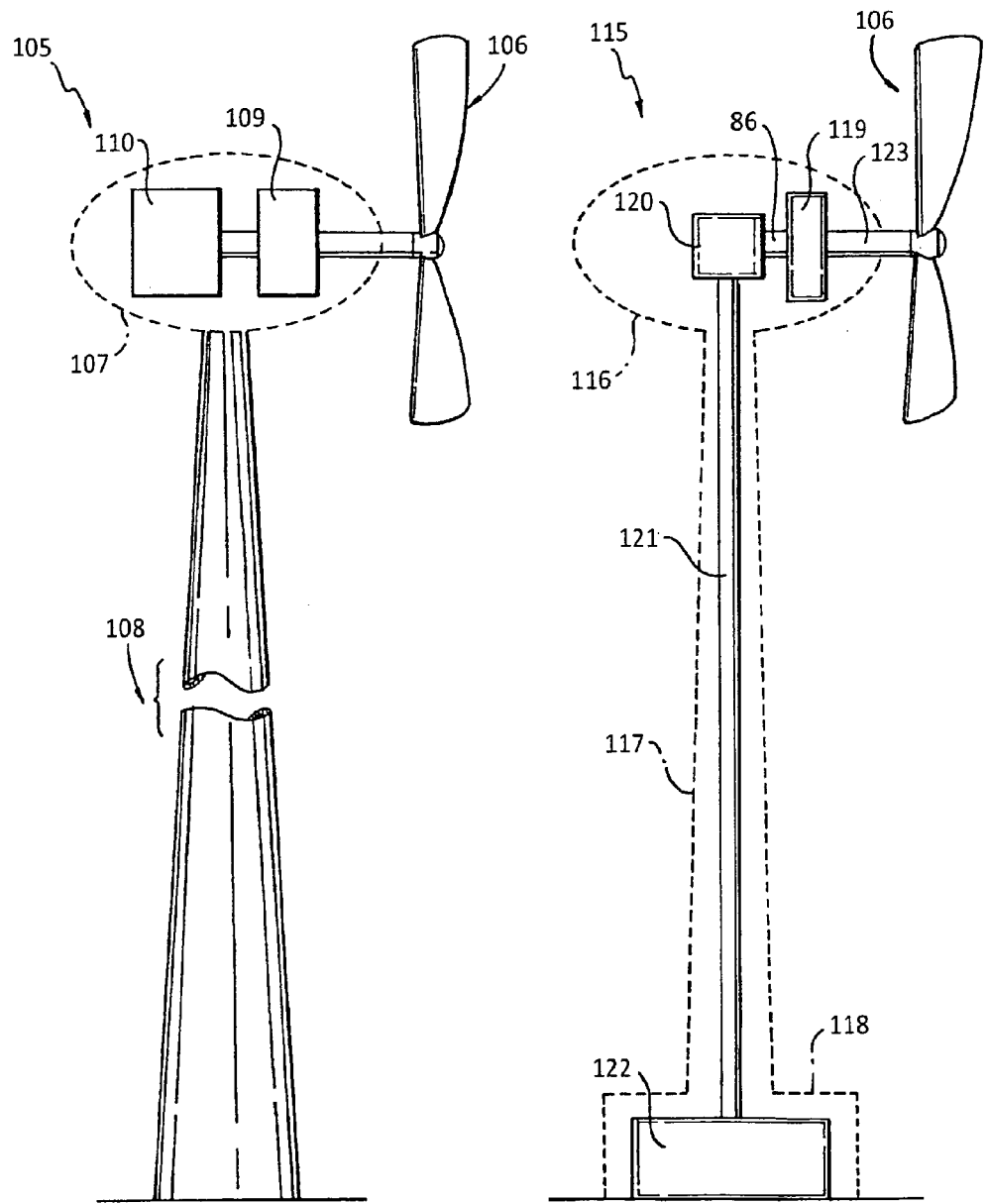
FIG. 12 is a side schematic view of a typical horizontal axis wind turbine showing gearbox and generator in the nacelle (prior art)
FIG. 13 is a side schematic view of the preferred embodiment of wind turbine of this invention enabled by the use of bearing tooth gears.
Figure 14:
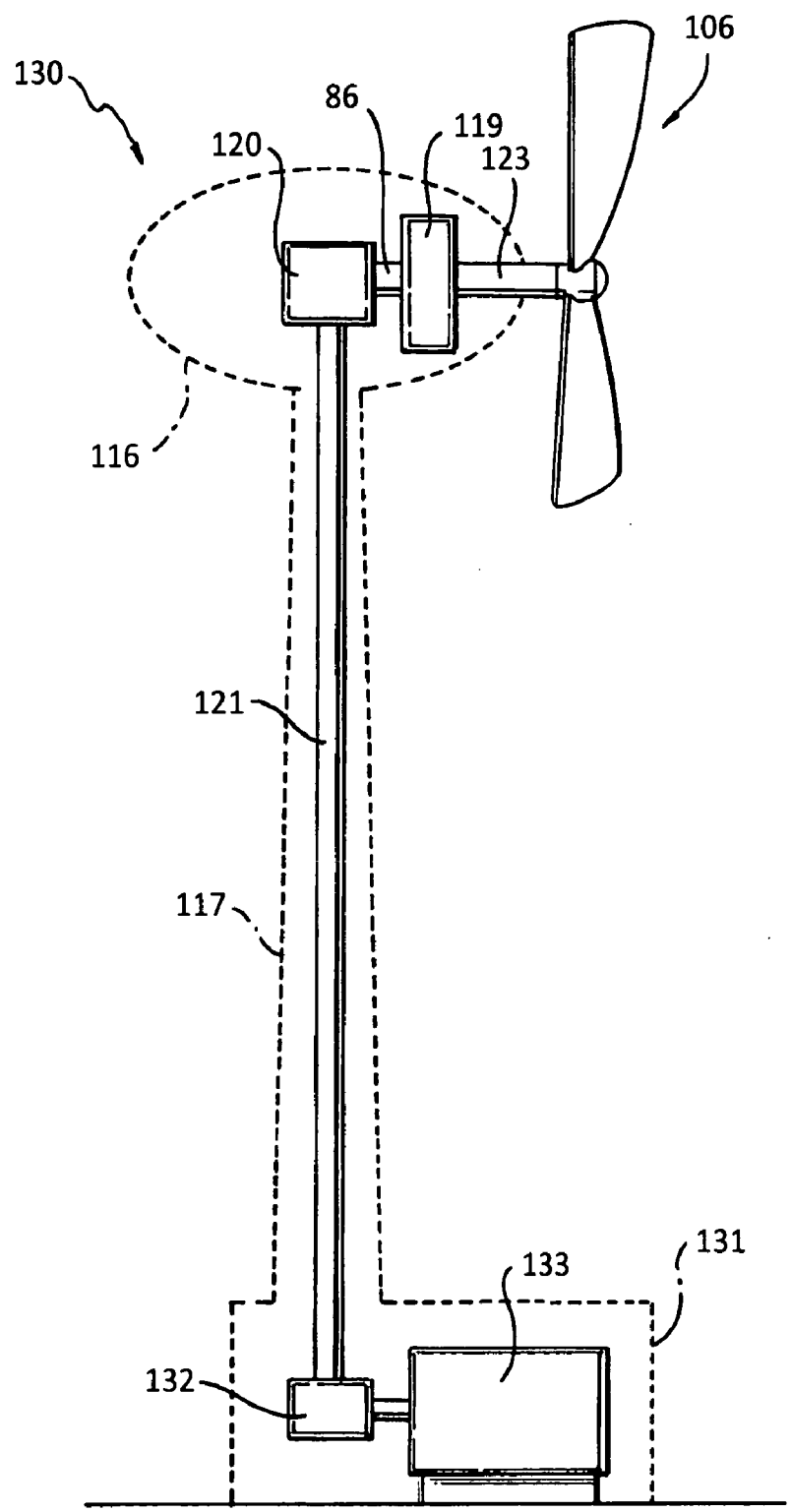
FIG. 14 is a side schematic view of an alternate embodiment of wind turbine of this invention using a horizontal axis generator located at the base.

For wind turbine applications of these bearing tooth gear sets are shown in the schematic diagrams of FIGS. 12-14.

The most common configuration of large wind turbine in use today 105 is illustrated by FIG. 12. This shows a nacelle 107 atop tall tower 108; this houses multi-stage gearbox 109 driving generator 110. For robustness and compactness, gearbox 109 is usually a planetary type. Multiple stages are required to achieve the speed multiplication from the very slow turbine 106 to the necessarily high speed generator 110. Higher speed generators are lighter and smaller diameter than low speed types; they are easier to fit in a cramped nacelle and also easier to raise up to nacelle elevation.

In the preferred embodiment of FIG. 13, a smaller nacelle 116 houses a single stage bearing tooth planetary gear box 119 (at least 4:1 or more ratio) driving a bearing tooth angle drive 120 (at least 2:1 or more ratio) via shaft 86 which rotates long shaft 121 inside tower 117. (Alternatively, this could be a 1:1 ratio with no change in speed between the input and output shafts.) Note that turbine shaft 123 which is also the input shaft to planetary gearbox 119 carries the full torque of the wind turbine. At its bottom end, shaft 121 is directly connected to low speed large diameter generator 122 which is in housing 118. Using ratios of preferably 16:1, gear box 119 is sized to handle the full maximum torque of turbine 106 while angle drive 120 only must handle a percentage of that, such as $\frac{1}{16}$. Long shaft 121 must handle only $\frac{1}{16}$ of the turbine torque.

The overall speed increase of 16:1 would multiple a rated speed of 15 rpm of a very large turbine to 240 rpm at the generator, to the right angle drive which can increase the speed to 480 rpm with a 2:1 gear ratio to the shaft and then to the generator, which is reasonable. In this case, generator 122 has a vertical shaft.

To use a different numerical example with two 4:1 ratio planetary stages in series and a 2:1 angle drive, the angle drive would handle $\frac{1}{16}$ of the turbine torque while the long shaft would handle only $\frac{1}{32}$ of the turbine torque at a speed of 32 times the maximum turbine speed.

In the alternate embodiment of FIG. 14, a horizontal axis higher speed generator 133 is substituted by virtue of a second angle drive (here a right-angle drive) 132 which is also implemented using bearing tooth technology. In this embodiment, another stage or two of bearing tooth planetary gear drive can be inserted between the bottom right angle drive and generator 132 for greater speed increase.

In the preferred embodiments of FIGS. 15-18, bearing teeth of the bearing tooth gears have been changed from a round periphery to ones having a regular polygon shape to reduce contact stress concentrations. Furthermore, in a planetary gear one needs to restrict the rotation of one of the components, otherwise, with the rotation of the whole assembly, there wouldn't be any increase in speed of a particular component.

Figure 15:
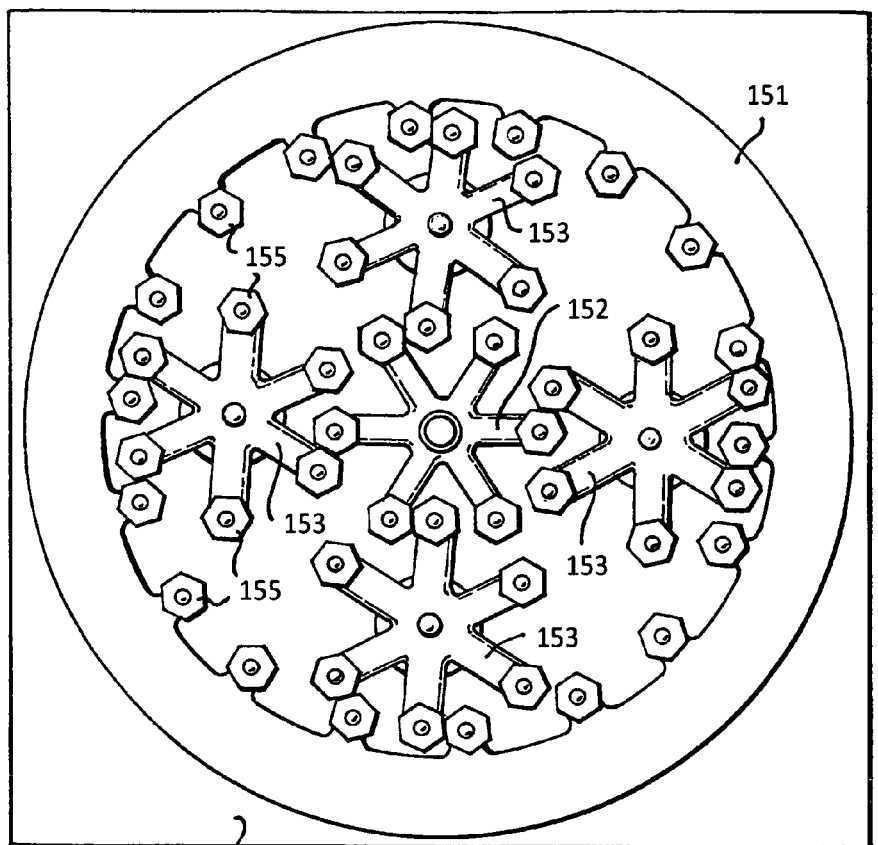
FIG. 15 is a top plan view of one stage of a planetary gear box using bearing tooth gears with hexagonal peripheries (or bearing contact housings) to minimize contact stress concentrations.

FIG. 15 is a simplified view of a single stage of a planetary gear box 150 with ring gear 151, sun gear 152, and four planet gears 153, which do not rotate, (the planet gear carrier is not shown for clarity). This is representative of any type of co-planar meshing gear configuration. Bearing teeth 155 with hexagonal periphery are used. These may also be bearings with round periphery fitted with press-fit hexagonal contact housings.

Figure 16:
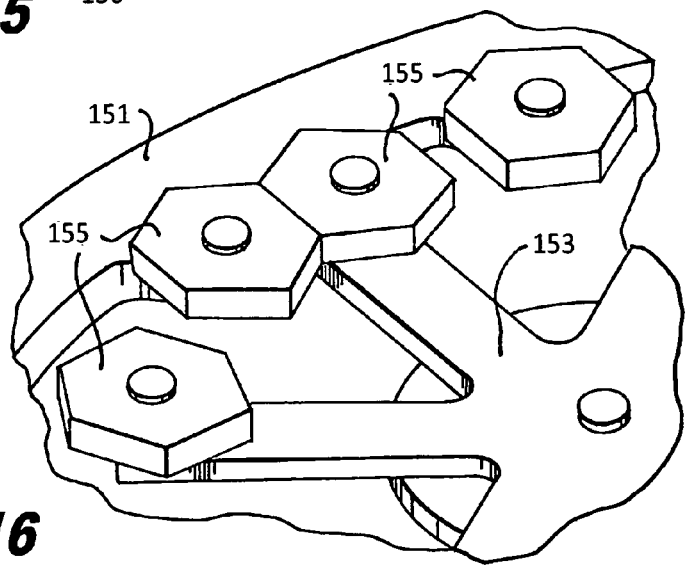
FIG. 16 is a perspective detail of the meshing of a planet gear with the ring gear in FIG. 15 showing the area contact introduced by the hexagonal shapes.

A detail of the meshing of the individual bearing teeth 155 is shown in detail in FIG. 16. Note that an area contact is now achieved.

Figure 17:
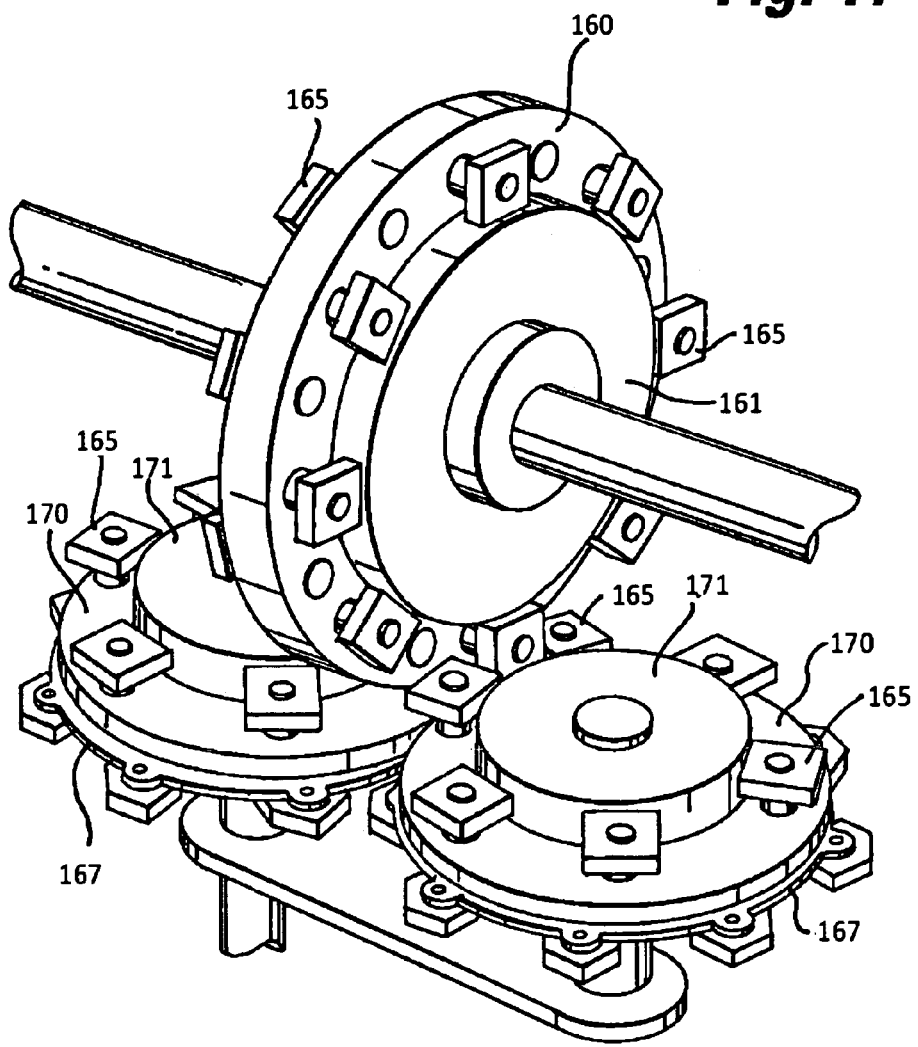
FIG. 17 is a simplified perspective view of a right-angle drive using bearing tooth gears with square peripheries (or bearing contact housings) to minimize contact stress concentrations; and, FIG. 18 is a top view detail of bearing teeth meshing in the right-angle drive of FIG. 17 showing the area contact introduced by the square shapes.

FIG. 17 shows a simplified right-angle drive using bearing teeth with square shaped peripheries (or press-fit contact housings of this shape). This is representative of orthogonal meshing gear sets. Note that vertical gear 160 is of the double-sided disk bearing tooth gear with offset (DDBTGO) type with square shaped bearings 165 on both surfaces meshing with horizontal gears 170 with square bearings 165 on their upper surfaces. Note the bosses 161 on gear 160 and 171 on gears 170; they prevent bearings 165 from rotating to the extent of chancing a corner engagement with a meshing bearing tooth. Meshed bearing tooth gears 167 attached to the undersides of horizontal gears 170 complete the power flow path. Since they are co-planar, gears 167 are shown with hexagonal periphery bearing teeth. (A pair of DDBTGO type gears with hexagonal bearing teeth can be substituted for gears 167 for smoother operation; see the illustration of FIG. 11 showing DDBTGO gears 95 and 96 for a round bearing tooth counterpart.)

Figure 18:
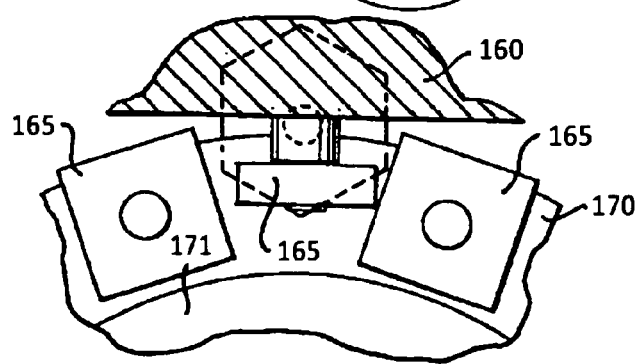

FIG. 18 shows a detail of the meshing just prior to bearing tooth 165 of gear 170 turning into alignment with bearing tooth 165 of gear 160. Here again, the stress concentration is relieved by the area contact provided. In summary, by using bearing tooth technology, the failure rate of wind turbines is reduced by both reducing the step-up gearbox ratios required as well as making them more reliable. By using multiple parallel plate and/or DDBTGO gear sets, multiple drive bearings introduce redundancy which makes the drive system more fault tolerant. This means that single (or few) tooth bearing failures would still permit adequate operation thus converting potential unscheduled maintenance to scheduled maintenance favorably impacting O&M costs. Accessibility for generator-associated failures or maintenance is vastly improved by relocating the equipment to ground level. Installation costs are reduced by the modularity of the bearing tooth gear drives as well as elimination of heavy generator subassembly lifting to the top of the tower.

In the foregoing description, certain terms and visual depictions are used to illustrate the preferred embodiment. However, no unnecessary limitations are to be construed by the terms used or illustrations depicted, beyond what is shown in the prior art, since the terms and illustrations are exemplary only, and are not meant to limit the scope of the present invention.

It is further known that other modifications may be made to the present invention, without departing the scope of the invention, as noted in the appended Claims.

I claim:

1. A horizontal axis wind turbine, comprising:
    a vertically extending tower
    a rotatable long shaft within said tower;
    a bottom end of said long shaft having means to drive an electric generator;
    a top end of said long shaft connected to a power output gear means of a bearing tooth angle drive;
    said power output gear means engaged with a power input gear in said bearing tooth angle drive; and
    said power input gear being connected by drive shafts through a bearing tooth planetary gear drive to blades of a wind turbine for receiving power from said wind turbine and delivering torque to said long shaft for driving said generator;
    wherein said bearing tooth angle drive and bearing tooth planetary gear drive are contained within a nacelle;
    wherein said planetary gear drive comprises:

an input shaft receiving drive power from said turbine blades and an output shaft for delivery of drive power to said bearing tooth angle drive;

a rotating ring gear;

planet gears connected through a carrier which do not rotate and are fixed;

a sun gear connected to said output shaft; and each of said planet gears having arms each supporting a bearing tooth with a regular polygon periphery in which flat surfaces provide area contact with matching bearing teeth on said ring gear and said sun gear.

2. The wind turbine of claim 1 in which said bearing teeth have hexagonal peripheries.

3. The wind turbine of claim 1 in which an inner surface of said ring gear has spaced protuberances each supporting for rotation a bearing tooth with said polygon periphery.

4. A horizontal axis wind turbine, comprising:

a vertically extending tower a rotatable long shaft within said tower;

a bottom end of said long shaft having means to drive an electric generator;

a top end of said long shaft connected to a power output gear means of a bearing tooth angle drive;

said power output gear means engaged with a power input gear in said bearing tooth angle drive; and said power input gear being connected by drive shafts through a bearing tooth planetary gear drive to blades of a wind turbine for receiving power from said wind turbine and delivering torque to said long shaft for driving said generator;

wherein said bearing tooth angle drive and bearing tooth planetary gear drive are contained within a nacelle;

wherein said bearing tooth angle drive comprises:

said power input gear having stationary square shaped bearings mounted on shafts extending from each side adjacent an outer periphery thereof, the square bearings on opposite sides being offset by half a pitch distance from each other;

said power output gear means comprising first and second co-planar gears at right angles to and on opposite sides of said power input gear, each of said first and second gears rotating on shafts parallel to each other and having on one side of each gear thereof facing said power input gear stationary square shaped bearings which move between and engage said square shaped bearings on opposite sides of said power input gear, the square bearings on said side surfaces of said input power gear adapted to also move along one side of said first and second gears, respectively and engaging the stationary square bearings on said first and second gears;

said shaft extending from said first gear being the output shaft of said bearing tooth angle drive;

said shaft extending from said second gear being an idler shaft; and a spacer member extending from said output shaft to and supporting said idler shaft for said second gear.

5. The wind turbine of claim 4 in which opposite sides of said first and second gears have meshing rotatable polygon shaped bearings.

6. The wind turbine of claim 5 in which said meshing polygon shaped bearings are hexagon shaped and mounted along peripheries of said first and second gears.

7. The wind turbine of claim 5 in which said power input gear is vertical being driven by a horizontal input shaft connected to said turbine, and said first and second gears are in a horizontal plane with said output shaft being vertical and connected to said long shaft, said stationary gears on said first and second gears being on the upper surfaces thereof.

8. The wind turbine of claim 7 in which said stationary bearings on said power input gear make area contact with said stationary bearings on said first and second gears.

9. The wind turbine of claim 8 in which the rotatable gears on said first and second gears make area contact with each other as they mesh together.

10. The wind turbine of claim 9 in which both sides of said vertical input gear have bosses to prevent rotation of said stationary bearings mounted on the side surfaces of said input gear.

11. The wind turbine of claim 10 having bosses on the upper surfaces of said first and second gears to prevent rotation of said stationary gears thereon.

12. A planetary gear drive comprising:

an input shaft receiving drive power from an input source and an output shaft;

a rotating ring gear;

planet gears connected through a carrier which do not rotate and are fixed;

a sun gear connected to said output shaft; and, each of said planet gears having arms each supporting a bearing tooth with a regular polygon periphery in which flat surfaces provide area contact with matching bearing teeth on said ring gear and said sun gear, each bearing tooth comprising a bearing thereby replacing sliding friction by rolling friction.

13. The planetary gear drive of claim 12 in which said bearing teeth have hexagonal peripheries.

14. The planetary gear drive of claim 12 in which an inner surface of said ring gear has spaced protuberances each supporting for rotation of each said bearing tooth with said polygon periphery.

* * * * *